Figures 1, 2:
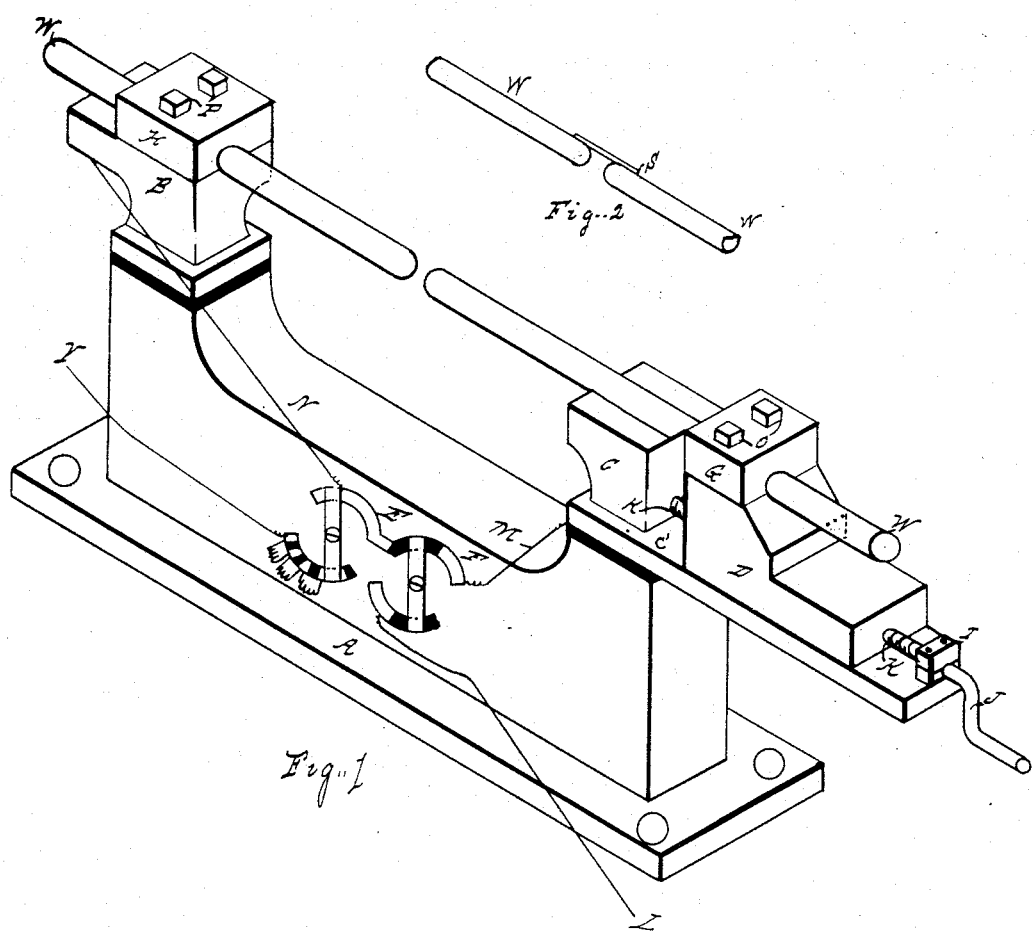

(No Model.)

C. L. COFFIN.
PROCESS OF ELECTRIC WELDING.

No. 412,599. Patented Oct. 8, 1889.

Witnesses
Geo. H. Lothrop
Adelaide A. Anderson

Inventor
Charles L. Coffin

UNITED STATES PATENT OFFICE.

CHARLES L. COFFIN, OF DETROIT, MICHIGAN.

PROCESS OF ELECTRIC WELDING.

SPECIFICATION forming part of Letters Patent No. 412,599, dated October 8, 1889.

Application filed April 24, 1889. Serial No. 308,415. (No model.)

*To all whom it may concern:*

Be it known that I, CHARLES L. COFFIN, of Detroit, in the county of Wayne and State of Michigan, have invented a new and useful Improvement in Process of Electric Welding, of which the following is a specification.

My invention consists in an improved process of electric welding, hereinafter fully described and claimed.

Figure 1 of the drawings is a perspective of an apparatus which may be used to practice my invention, and Fig. 2 shows a slight modification.

A represents a base, to one end of which is secured but insulated therefrom a block B, provided with a cap H and bolts P to form a clamp. C represents a similar block to but insulated from the other end of the frame, and extended, as shown at C', to form a bed for a movable clamp D, having a cap G secured thereto by the bolts O.

K represents a screw-rod passing through clamp C, and having a collar on its inner end (not shown) and tapped through clamp D, and terminating in a crank J at its outer end.

I represents a box to steady screw-rod K, secured to bed C'.

W W represent two metal rods to be welded together clamped in the clamps B H and D G in line with each other.

Y and L indicate electric conductors leading from the poles of an electrical generator, and respectively connected to the resistance-switch E and cut-out switch F.

E represents a resistance-switch for the purpose of regulating the current, and F represents a switch by which the circuit may be opened or closed.

M and N represent electrical conductors connecting the switches with the blocks C and B, respectively. These switches and electrical connections are well known and form no part of my invention.

The operation of my invention is as follows: The electric current being turned into the pieces W W, the clamp D G is moved by turning the screw-rod K until the ends of the rods W W come in contact, closing the current. The screw-rod is then reversed, slightly separating the ends of the rods and causing a voltaic arc to be formed between them, by which the ends of the rods are rapidly brought to welding heat. When this has been attained by means of the screw-rod K, the ends of the rods W W are pressed firmly together and held in contact until the weld is completed; or, instead of bringing the ends of the rods W W together and then separating them to form the arc, the space between them may be bridged by a light piece of metal S, Fig. 2, which serves to complete the circuit, and is destroyed by the passage of the current, thus forming the voltaic arc.

My invention differs from the known process of electric welding in which the two articles to be welded are brought into contact and heated by the effect of an electric current passing through them, in that it utilizes the enormous heat of the voltaic arc, and therefore permits much larger masses to be welded, and it is operative with much less current.

What I claim as my invention, and desire to secure by Letters Patent, is—

The herein-described process of welding together two metal rods or bars, the same consisting in placing the articles to be welded in an electric circuit, closing said circuit, then breaking the circuit between the articles to be welded, whereby the voltaic arc is formed at the point of the weld, pressing the articles together and holding them permanently in contact after the ends or edges have reached a welding heat, and passing heating-currents through the articles while so pressed and held until they are welded one to the other, substantially as described.

CHARLES L. COFFIN.

Witnesses:
   GEO. H. LOTHROP,
   ADELAIDE A. ANDERSON.